Patented Nov. 7, 1950

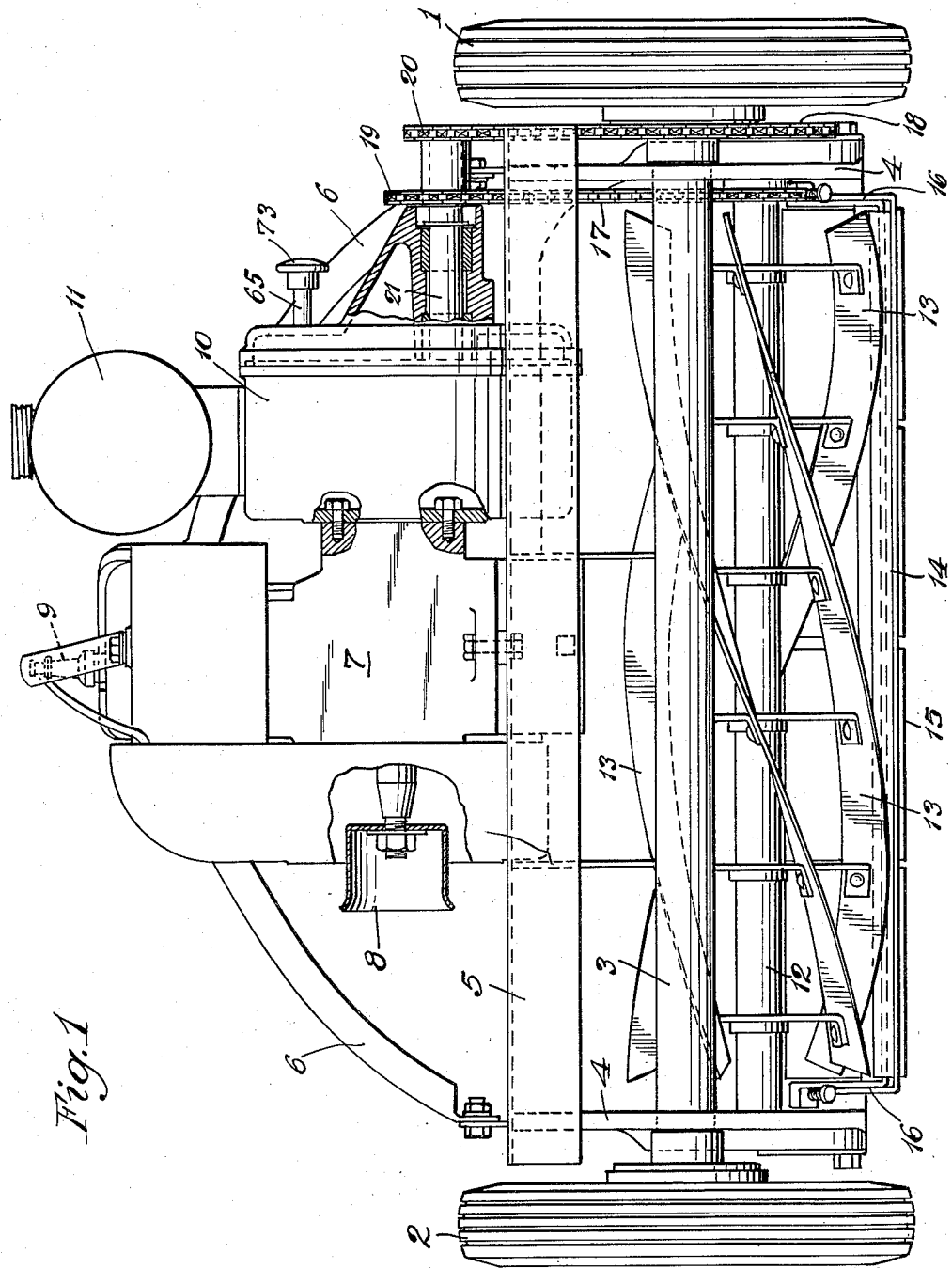

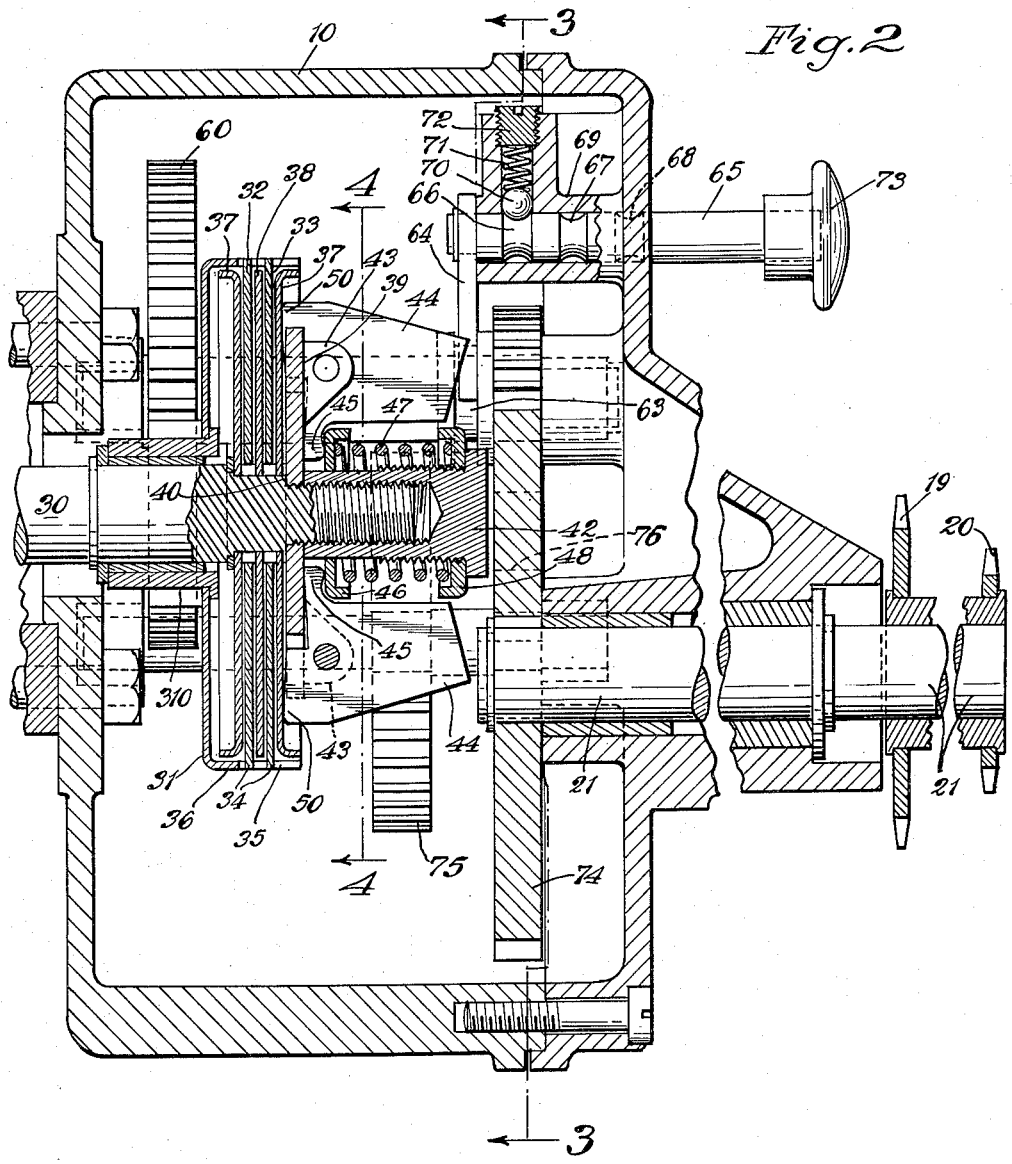

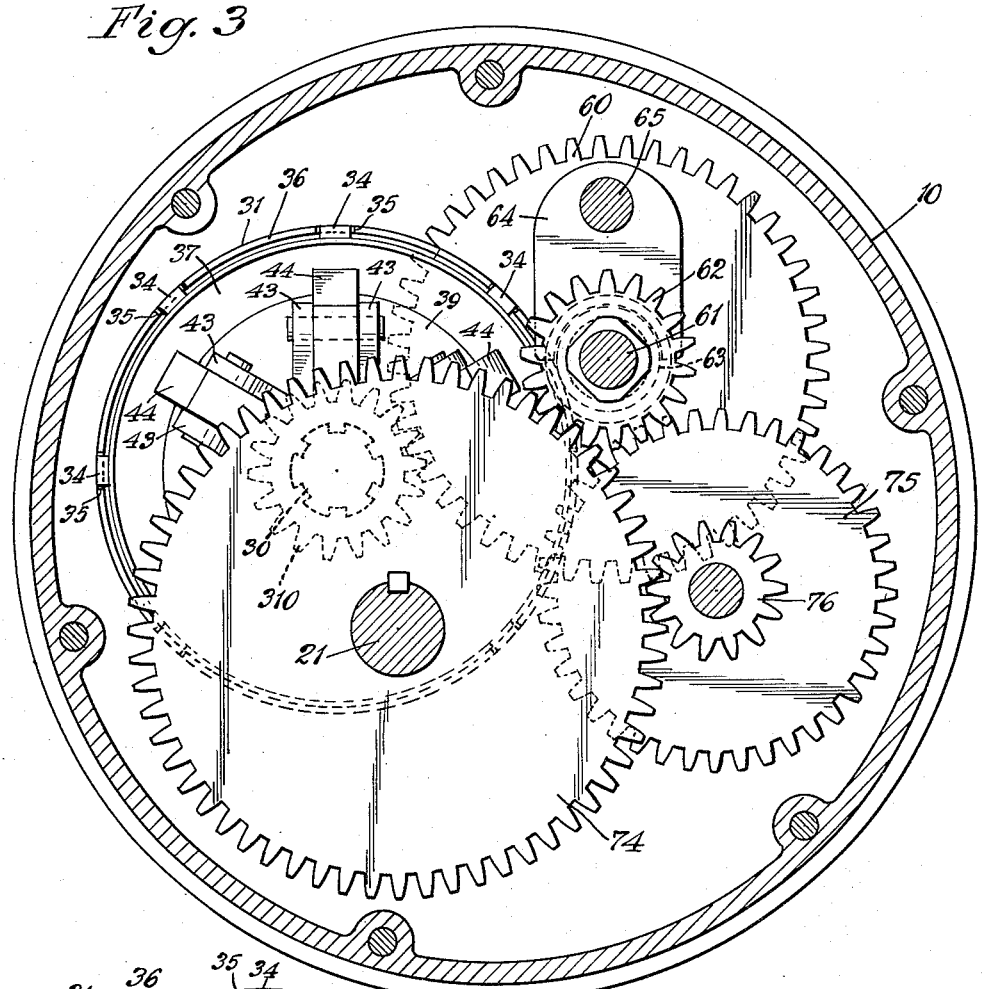

2,529,014

UNITED STATES PATENT OFFICE 2,529,014

ROTATING CUTTING REEL POWER LAWN MOWER

Harry Goldberg and Milford D. Burrows, Chicago, Ill., assignors to Pioneer Gen-E-Motor Corporation, Chicago, Ill., a corporation of Delaware Application February 21, 1947, Serial No. 730,004

5 Claims. (Cl. 56—26)

Our invention relates to improvements in lawn mowers and the like and has for one object to provide a new and improved type of power-driven lawn mower wherein a centrifugal clutch is used to insure that the operator will not stall the relatively light, high-speed motor used to propel the lawn mower and operate the cutting reel.

A lawn mower of the type in question is light, and must be light. A motor which would successfully carry any substantial overload, such as is frequently the case when too thick or too heavy or too wet grass must be cut, would be so heavy that the lawn mower would be unmanageable. Therefore, other means must be provided to insure against stalling of the motor, and the centrifugal clutch which we propose to use accomplishes this purpose, because long before the overload reaches the point where stalling of the motor is imminent, the centrifugal clutch lets go, thus giving the operator the opportunity to pull back the reel and disengage it from whatever it may be that causes the overload.

Our invention is illustrated more or less diagrammatically in the accompanying drawings, wherein:

Figure 1 is a front elevation of the lawn mower;

Figure 2 is a vertical section, with parts omitted, of the clutch and gear box;

Figure 3 is a section along the line 3—3 of Figure 2;

Figure 4 is a section along the line 4—4 of Figure 2.

Like parts are indicated by like characters in the specification and drawings.

The lawn mower comprises rubber tired wheels 1, 2 mounted on a rotary axle 3 in frame members 4, 4 tied together by a cross main frame 5 on which is pivoted the handled fork 6. The main frame carries internal combustion engine 7 with starting pulley 8, spark plug 9, gear box 10, gasoline or fuel supply 11. 12 is the reel axle rotatably mounted in the frame members 4 and carrying the reel blades 13 adapted to rotate in opposition to a cutter bar 14 which is mounted on brackets 16. 15 is a roller assembly supported and mounted on the frame members 4. The main shaft 3 and the reel axle 12 are both driven by sprocket chains 17, 18, traveling over drive sprockets 19 and 20, which sprockets are rigidly mounted on the drive shaft 21.

Referring now specifically to Figures 2, 3 and 4, 30 is the outboard end of the engine shaft, which extends into the gear box 10. 310 is a master pinion rotatable on the shaft 30 and carrying rigidly mounted thereon a clutch housing 31. 32, 33 are clutch plates contained within the housing 31, having radially extending fingers 34 loosely engaged in slots 35 in the outer peripheral wall 36 of the clutch housing 31. These plates are free to move longitudinally of the shaft 30, the fingers remaining in engagement with the slots 35, but are held against rotation with respect to the clutch housing by such engagement. 37, 38 are clutch plates splined on the shaft 30, but free to move longitudinally thereof and held against rotation with respect thereto. 39 is a stop plate on the reduced end of the shaft 30, held in place thereon against a shoulder 40, as indicated, by the interiorly threaded sleeve 42. This plate carries a plurality of abutments 43 in which are pivoted centrifugal weights 44. These weights have spring-pressed fingers 45 engaged by collar 46, which in turn is engaged by a spring 47, forced by the nut 48 exteriorly threaded on the sleeve 42 so as to set up an initial tension-resisting rotary movement of the weights and holding them against the plate 39.

When engine speed exceeds a predetermined point, the weights 44 are rotated outwardly so that the foot 50 engages the outer clutch plate 37, and through that plate applies pressure through the remaining plates to cause the clutch to operate so that the clutch housing 31 carrying with it the pinion 310 rotates with the shaft.

The pinion 310 is in mesh with a gear 60, which rotates a squared shaft 61 on which is slidable a pinion 62. The pinion 62 has a hub grooved at 63 to be engaged by a fork 64 on the push shaft 65. The push shaft is notched at 66, 67 and 68, slides in a sleeve 69 engaged by a ball 70 thrust by a spring 71 adjustable by a nut 72 so as to lock the push shaft 65 in any one of three positions. When pressure is applied to the hand piece 73, and the push shaft 65 is moved to the left from the driving position as shown in Figure 2, the pinion 62 is disengaged from the gear 74 on the shaft 21, and the device is in the neutral position with the ball engaging the notch 67. If further movement is effected by pushing on the hand piece 73, the ball 66 will engage the notch 68, and under these circumstances the pinion 62 engages the gear 75. The gear 75 carries a pinion 76 in mesh with the gear 74 for reversing rotation of shaft 21.

It will be realized that whereas we have illustrated and described an operative device, still many changes may be made without departing materially from the spirit of our invention, and we wish, therefore, that our showing be taken as

We claim:

1. A power lawn mower having a main frame, ground-engaging driving wheels, a grass-cutting element, and a light, high-speed motor on the frame, and separate driving connections for the driving wheels and the grass-cutting element, the motor being of such limited power that while it is able to propel the lawn mower and operate the grass-cutting element under ordinary working conditions, it will not carry an overload, and speed responsive means on the motor shaft for automatically causing slippage between the motor shaft and the grass cutting element.

2. A power lawn mower having a main frame, ground-engaging driving wheels, a grass-cutting element, and light, high-speed motor on the frame, and separate driving connections for the driving wheels and the grass-cutting element, the motor being of such limited power that while it is able to propel the lawn mower and operate the grass-cutting element under ordinary working conditions, it will not carry an overload, and on the motor shaft means for automatically causing slippage between the motor shaft and the grass cutting element, including a clutch and centrifugally impelled weights rotating with the shaft to cause clutch operation and adjustable means on the shaft for overcoming the centrifugal effect of the weights.

3. A power lawn mower having a main frame, ground-engaging driving wheels, a grass-cutting element, and a light, high-speed motor on the frame, and separate driving connections for the driving wheels and the grass-cutting element, the motor being of such limited power that while it is able to propel the lawn mower and operate the grass-cutting element under ordinary working conditions, it will not carry an overload, and speed responsive means on the motor shaft for automatically causing slippage between the motor shaft and the grass cutting element, including a pinion mounted for rotation on the motor shaft, a clutch housing rigidly mounted on the pinion, clutch plates in the housing free to rotate about the motor shaft and free to move longitudinally of the shaft but held against rotation with respect to the housing, other clutch plates in the housing held against rotation with respect to the shaft but free to move longitudinally of the shaft, an abutment plate forming one wall of the housing, mounted for rotation with the motor shaft, a plurality of flyweights pivoted on the outside face of the plate, a spring encircling the shaft, means for adjusting the tension on the spring, said spring engaging the weights on one side of the pivot point and resisting their movement under centrifugal force, feet on the weights on the other side of the pivot point adapted to engage one of the plates to force the plates into engagement to cause driving operation of the clutch as the centrifugal force overcomes the spring tension.

4. A power lawn mower having a main frame, ground-engaging driving wheels, a grass-cutting element, and light, high-speed motor on the frame, and separate driving connections for the driving wheels and the grass-cutting element, the motor being of such limited power that while it is able to propel the lawn mower and operate the grass-cutting element under ordinary working conditions, it will not carry an overload, and speed responsive means on the motor shaft for automatically causing slippage between the motor shaft and the grass cutting element, including a pinion mounted for rotation on the motor shaft, a clutch housing rigidly mounted on the pinion having a back wall and a peripheral wall, slots in said peripheral wall, clutch plates in the housing having fingers extending into said slots and held against rotation with respect to the housing thereby but free to move longitudinally of the shaft and to rotate about the shaft, other clutch plates in the housing held against rotation with respect to the shaft but free to move longitudinally of the shaft, an abutment plate rigidly mounted for rotation on the shaft and forming a partial front wall for the housing and defining with said peripheral wall an annular opening between the circumferential edge of the abutment plate and the inner face of the peripheral wall, projections on the outer face of the abutment plate, flyweights pivoted on said projections and having feet extending into said annular opening and in contact with one of said clutch plates for forcing the clutch plates together as the centrifugal force overcomes the spring tension, other feet on said flyweights on the side of the pivot opposite said first-named feet, a spring encircling the shaft and engaging said second-named feet to resist the movement of said flyweights under centrifugal force, and an annular flange surrounding the outer end of said spring and threadably mounted on said shaft to adjust the tension on said spring.

5. A power lawn mower having a main frame, ground-engaging driving wheels, a grass-cutting element, and a light, high-speed motor on the frame, driving connections between the motor and the driving wheels and the cutting element, the motor being of such limited power that while it is able to propel the lawn mower and operate the grass-cutting element under ordinary working conditions, it will not carry an overload, and means for automatically causing slippage between the motor shaft and the grass-cutting element and between the motor shaft and the driving wheels.

HARRY GOLDBERG.
MILFORD D. BURROWS.

REFERENCES CITED

The following references are of record in the file of this patent:

UNITED STATES PATENTS

| Number | Name | Date |
|---|---|---|
| 766,551 | Sturtevant | Aug. 2, 1904 |
| 865,450 | Sturtevant | Sept. 10, 1907 |
| 1,235,509 | Thompson | July 31, 1917 |
| 1,664,954 | Tydeman | Apr. 3, 1928 |
| 1,718,105 | Benn | June 18, 1929 |
| 1,823,129 | Smith et al. | Sept. 15, 1931 |
| 1,902,524 | Roth | Mar. 21, 1933 |
| 1,969,661 | Nardone | Aug. 7, 1934 |
| 2,097,351 | Smith | Oct. 26, 1937 |
| 2,108,105 | Cotterman | Feb. 15, 1938 |
| 2,154,419 | Cotterman | Apr. 18, 1939 |

FOREIGN PATENTS

| Number | Country | Date |
|---|---|---|
| 628,933 | France | July 11, 1927 |